US008310394B2

(12) United States Patent
Kim et al.

(10) Patent No.: US 8,310,394 B2
(45) Date of Patent: Nov. 13, 2012

(54) APPARATUS, METHOD, MANUFACTURE, AND SYSTEM FOR SENSING SUBSTITUTION FOR LOCATION-BASED APPLICATIONS

(75) Inventors: Kyu-Han Kim, Redwood City, CA (US); Zhenyun Zhuang, Atlanta, GA (US); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 270 days.

(21) Appl. No.: 12/719,391

(22) Filed: Mar. 8, 2010

(65) Prior Publication Data

US 2011/0215966 A1 Sep. 8, 2011

(51) Int. Cl.
*G01S 19/48* (2010.01)
(52) U.S. Cl. .................................. 342/357.31
(58) Field of Classification Search ............ 342/357.31
See application file for complete search history.

(56) References Cited

U.S. PATENT DOCUMENTS

| 6,002,936 | A * | 12/1999 | Roel-Ng et al. | 455/456.4 |
| 6,175,740 | B1 * | 1/2001 | Souissi et al. | 455/456.3 |
| 6,813,501 | B2 * | 11/2004 | Kinnunen et al. | 455/456.2 |
| 6,968,195 | B2 * | 11/2005 | Nowak | 455/456.2 |
| 7,151,939 | B2 * | 12/2006 | Sheynblat | 455/456.1 |
| 7,558,696 | B2 * | 7/2009 | Vilppula et al. | 702/150 |
| 2009/0219209 | A1 * | 9/2009 | Bush et al. | 342/450 |

FOREIGN PATENT DOCUMENTS

JP  2000102058 A *  4/2000

OTHER PUBLICATIONS

Abdesslem et al., Less is More: Energy-Efficient Mobile Sensing with SenseLess, MobiHeld '09: Proceedings of the 1st ACM workshop on Networking, systems, and applications for mobile handhelds, pp. 61-62, New York, NY, USA, 2009. ACM.

Anand et al., Self-Tuning Wireless Network Power Management, MobiCom '03: Proceedings of the 9th annual international conference on Mobile computing and networking, pp. 176-189, New York, NY, USA, 2003. ACM.

Ananthanarayanan et al., StarTrack: A Framework for Enabling Track-Based Applications, MobiSys '09: Proceedings of the 7th international conference on Mobile systems, applications, and services, pp. 207-220, New York, NY, USA, 2009. ACM.

Azizyan et al., SurroundSense: Mobile Phone Localization Using Ambient Sound and Light, SIGMOBILE Mob. Comput. Commun. Rev., 13(1):69-72, 2009.

Brezmes et al., Activity Recognition from Accelerometer Data on a Mobile Phone, IWANN '09: Proceedings of the 10th International Work-Conference on Artificial Neural Networks, pp. 796-799, Berlin, Heidelberg, 2009. Springer-Verlag.

(Continued)

*Primary Examiner* — Gregory C Issing
(74) *Attorney, Agent, or Firm* — Leydig, Voit & Mayer, Ltd.

(57) ABSTRACT

A method and apparatus for communicating over a network is provided. The method includes selecting between location-sensing methods for an LBA, such as between GPS and network triangulation. For each location-sensing method, a dynamic determination is made as to whether the accuracy of the location-sensing method, in the current environment, meets the application requirements. If two or more location-sensing methods meet the application requirements, then, location-sensing method selected is the location-sensing method that, from among the location-sensing methods that meet the application requirement, consumes the least power. Otherwise, the location-sensing method that is most accurate for the current environment is selected.

20 Claims, 7 Drawing Sheets

OTHER PUBLICATIONS

Campbell et al., Transforming the Social Networking Experience with Sensing Presence from Mobile Phones, SenSys '08: Proceedings of the 6th ACM conference on Embedded network sensor systems, pp. 367-368, New York, NY, USA, 2008. ACM.

Constandache et al., EnLoc: Energy-Efficient Localization for Mobile Phones, Proceedings of IEEE INFOCOM Mini Conference, Rio de Janeiro, Brazil, 2009.

Deshpande et al., Predictive Methods for Improved Vehicular WiFi Access, MobiSys '09: Proceedings of the 7th international conference on Mobile systems, applications, and services, pp. 263-276, New York, NY, USA, 2009. ACM.

Eisenman et al., The BikeNet Mobile Sensing System for Cyclist Experience Mapping, SenSys '07: Proceedings of the 5th international conference on Embedded networked sensor systems, pp. 87-101, New York, NY, USA, 2007. ACM.

Gaonkar et al., Micro-Blog: Sharing and Querying Content Through Mobile Phones and Social Participation, MobiSys '08: Proceeding of the 6th international conference on Mobile systems, applications, and services, pp. 174-186, New York, NY, USA, 2008. ACM.

Gellersen et al., Multi-Sensor Context-Awareness in Mobile Devices and Smart Artifacts, Mob. Netw. Appl., 7(5):341-351, 2002.

Györbíró et al., An Activity Recognition System for Mobile Phones, Mob. Netw. Appl., 14(1):82-91, 2009.

Hoh et al., Virtual Trip Lines for Distributed Privacy-Preserving Traffic Monitoring, MobiSys '08: Proceeding of the 6th international conference on Mobile systems, applications, and services, pp. 15-28, New York, NY, USA, 2008. ACM.

Hull et al., Cartel: A Distributed Mobile Sensor Computing System, SenSys '06: Proceedings of the 4th international conference on Embedded networked sensor systems, pp. 125-138, New York, NY, USA, 2006. ACM.

Kang et al., SeeMon: Scalable and Energy-efficient Context Monitoring Framework for Sensor-rich Mobile Environments, MobiSys '08: Proceeding of the 6th international conference on Mobile systems, applications, and services, pp. 267-280, New York, NY, USA, 2008. ACM.

Lu et al., Soundsense: Scalable Sound Sensing for People-Centric Applications on Mobile Phones, MobiSys '09: Proceedings of the 7th international conference on Mobile systems, applications, and services, pp. 165-178, New York, NY, USA, 2009. ACM.

Miluzzo et al., Sensing Meets Mobile Social Networks: The Design, Implementation and Evaluation of the CenceMe Application, SenSys '08: Proceedings of the 6th ACM conference on Embedded network sensor systems, pp. 337-350, New York, NY, USA, 2008. ACM.

Mohan et al., Nericell: Rich Monitoring of Road and Traffic Conditions using Mobile Smartphones, SenSys '08: Proceedings of the 6th ACM conference on Embedded network sensor systems, pp. 323-336, New York, NY, USA, 2008. ACM.

Lester et al., Sensing and Modeling Activities to Support Physical Fitness, Oct. 2005. http://citeseerx.ist.psu.edu/ viewdoc/summary?doi=10.1.1.119.9811.

Shih et al., Wake on Wireless: An Event Driven Energy Saving Strategy for Battery Operated Devices, MobiCom '02: Proceedings of the 8th annual international conference on Mobile computing and networking, pp. 160-171, New York, NY, USA, 2002. ACM.

Sorber et al., Turducken: Hierarchical Power Management for Mobile Devices, MobiSys '05: Proceedings of the 3rd international conference on Mobile systems, applications, and services, pp. 261-274, New York, NY, USA, 2005. ACM.

Viredaz et al., Energy Management on Handheld Devices, Queue, 1(7):44-52, 2003.

Wang et al., A Framework of Energy Efficient Mobile Sensing for Automatic User State Recognition, MobiSys '09: Proceedings of the 7th international conference on Mobile systems, applications, and services, pp. 179-192, New York, NY, USA, 2009. ACM.

Yoon et al., Surface Street Traffic Estimation, MobiSys '07: Proceedings of the 5th international conference on Mobile systems, applications and services, pp. 220-232, New York, NY, USA, 2007. ACM.

* cited by examiner (I) Horizontal merging      (II) Vertical merging

US 8,310,394 B2

APPARATUS, METHOD, MANUFACTURE, AND SYSTEM FOR SENSING SUBSTITUTION FOR LOCATION-BASED APPLICATIONS

TECHNICAL FIELD

The present invention relates generally to computer networks, and in particular but not exclusively, to an apparatus, method, system, and manufacture for energy-efficient selection of a location-based sensing method for location-based applications.

BACKGROUND

As mobile Internet becomes pervasive, Location-Based Applications (LBAs) are rapidly adopted by mobile users for always-on contact with friends, business, entertainment, and others. Examples of such LBAs include mobile social-network applications (e.g., Twitter, Facebook), local restaurant, and real-time traffic applications. Furthermore, as open smartphones such as Android phones become available, the more number of location-based applications are being developed.

However, even though smartphones become powerful enough to support various LBAs (e.g., being equipped with new sensors such as Global Positioning System or GPS), they still suffer from limited battery life, hindering the active usage of LBAs. Typical battery capacity of a smartphone today is barely above 1000 mAh (e.g., the lithium-ion battery of HTC Dream smartphone has the capacity of 1150 mAh). Unfortunately, the use of GPS, which is the core of LBAs, is power-intensive, and can cause the complete drain of the battery within a few hours.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, in which.

DETAILED DESCRIPTION

Figure 1:
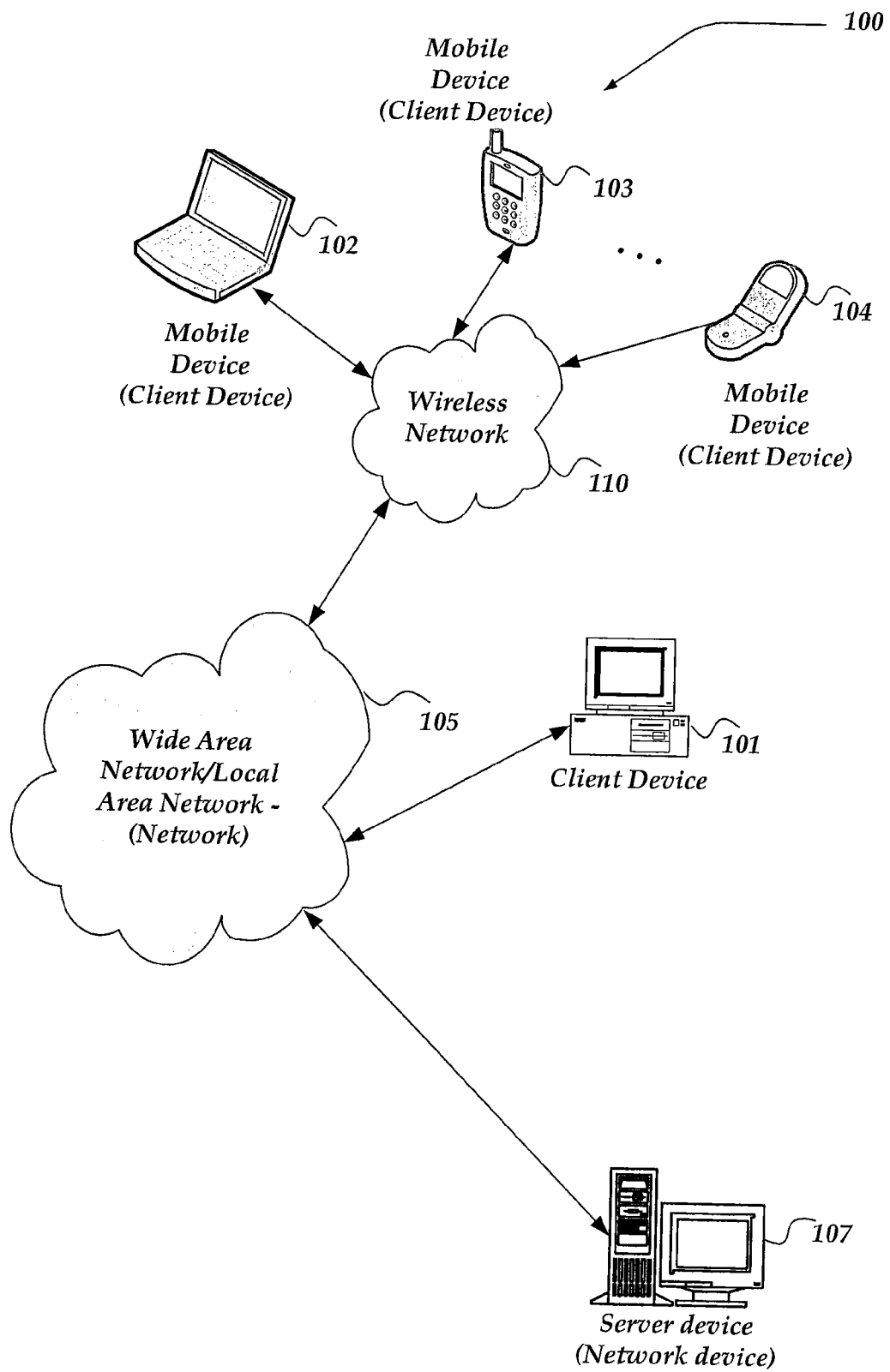
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method and apparatus for communicating over a network is provided. The method includes selecting between location-sensing methods for an LBA, such as between GPS and network triangulation. For each location-sensing method, a dynamic determination is made as to whether the accuracy of the location-sensing method, in the current environment, meets the application requirements. If two or more location-sensing methods meet the application requirements, then, location-sensing method selected is the location-sensing method that, from among the location-sensing methods that meet the application requirement, consumes the least power. Otherwise, the location-sensing method that is most accurate for the current environment is selected.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105, wireless network 110, Trust Search Server (TSS) 106, mobile devices (client devices) 102-104, client device 101, and server device (network device) 107.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as server devices 107, or the like. In one embodiment, a credential, login username/password, or other information is employed to enable the user access to content at one or more of server devices 107-109, or the like. Such user account, for example, may be configured to enable the user to receive emails, send/receive IM messages, SMS messages, access selected web pages, and/or participate in any of a variety of other social networking activities. However, managing of messages or otherwise participating in other social activities may also be performed without logging into a user account.

In one embodiment, the user of client devices 101-104 may be enabled to access a web page, perform a query search for various content, and/or other perform any of a variety of other activities. For example, client devices 101-104 may enable a user to participate in various social networking sites, such as Twitter, LinkedIn, Facebook, and the like. In some embodiments, the users of client devices 101-104 may use locations-based applications (LBAs), which, as part of their functions, use GPS or other means to determine the current location of the client device.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple server device 107 and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Server device 107 may include virtually any network device that is configured to provide content and/or services over a network to another computing device. Server device 107 may further host a variety of social networking sites, including, but not limited to Flicker, Twitter, Facebook, LinkedIn, personal user sites, such as blogs, vlogs, online dating sites, and so forth. Server device 107 may also host a variety of non-social networking sites, including, but not limited, to various business sites, educational sites, dictionary sites, encyclopedia type sites, financial sites, government sites, and the like.

Server device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Devices that may operate as server device 107 include personal computers desktop computers, multiprocessor systems, microprocessor-based or programmable consumer electronics, network PCs, servers, and the like.

Illustrative Mobile Client Environment

Figure 2:
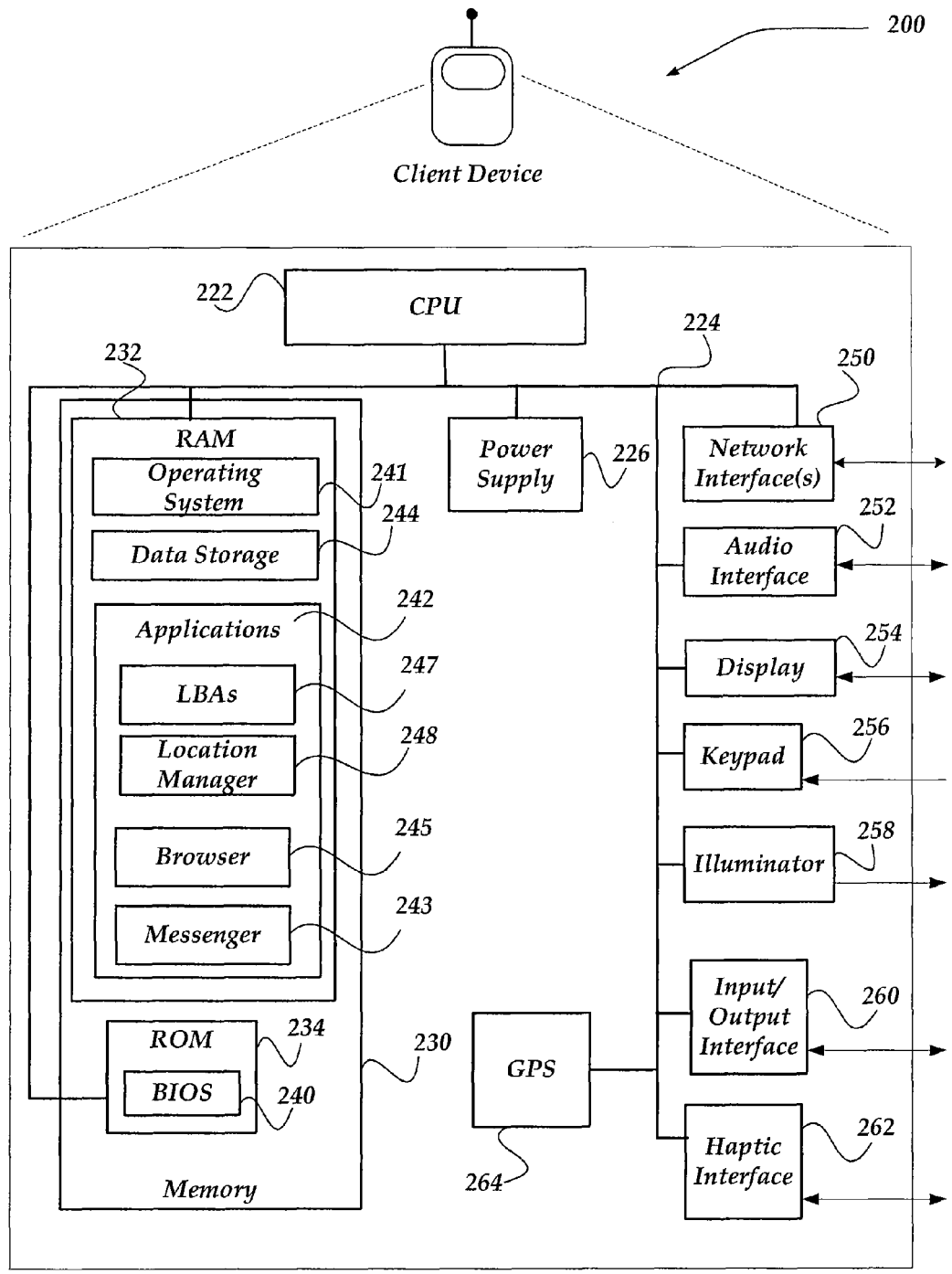
FIG. 2 illustrates a block diagram of one embodiment of a mobile device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other physical storage devices. Mass memory 230 illustrates an example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, login username/passwords, credentials, user profiles, or the like. At least a portion of the social networking information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, one or more location-based applications (LBAs) 247, and Location manager 248.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), Hyper-Text Markup Language (HTML), eXtensible Markup Language (XML), and the like, to display and send a message. However, any of a variety of other web-based languages may also be employed. Moreover, browser 245 may be employed to request various content and/or receive such content.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols.

As previously discussed, Applications 242 include one or more location-based applications (LBAs) 247. An LBA 247 may make use of GPS, network triangulation, and/or other location sensing methods to determine the location of client device 200. There are many different reasons that an LBA 247 may be determining the location of client device 200. For example, a weather application may determine the location of client device 200 in order to know the user's location for which to indicate the weather in that location. A social networking program may determine the user's current location in order to indicate the user's current location and/or status. A restaurant application may use this location so that a determination can be made as to which restaurants are near the user. As yet another example, a navigational program may be used to help the user navigate to a desired location based on the user's current location.

Location manager 248 is employed to determine which location sensing method is to be used by the location-based LBAs 247. Location manager 248 determines which location sensing method is to be used by each LBA 247, and may even use a different method than specified by LBA 247. For example, even if an LBA 247 specifies that GPS should be used to determine location, location manager 248 determines which location sensing method is to be used and may use network triangulation to determine location rather than the specified GPS method.

Illustrative Network Device

Figure 3:
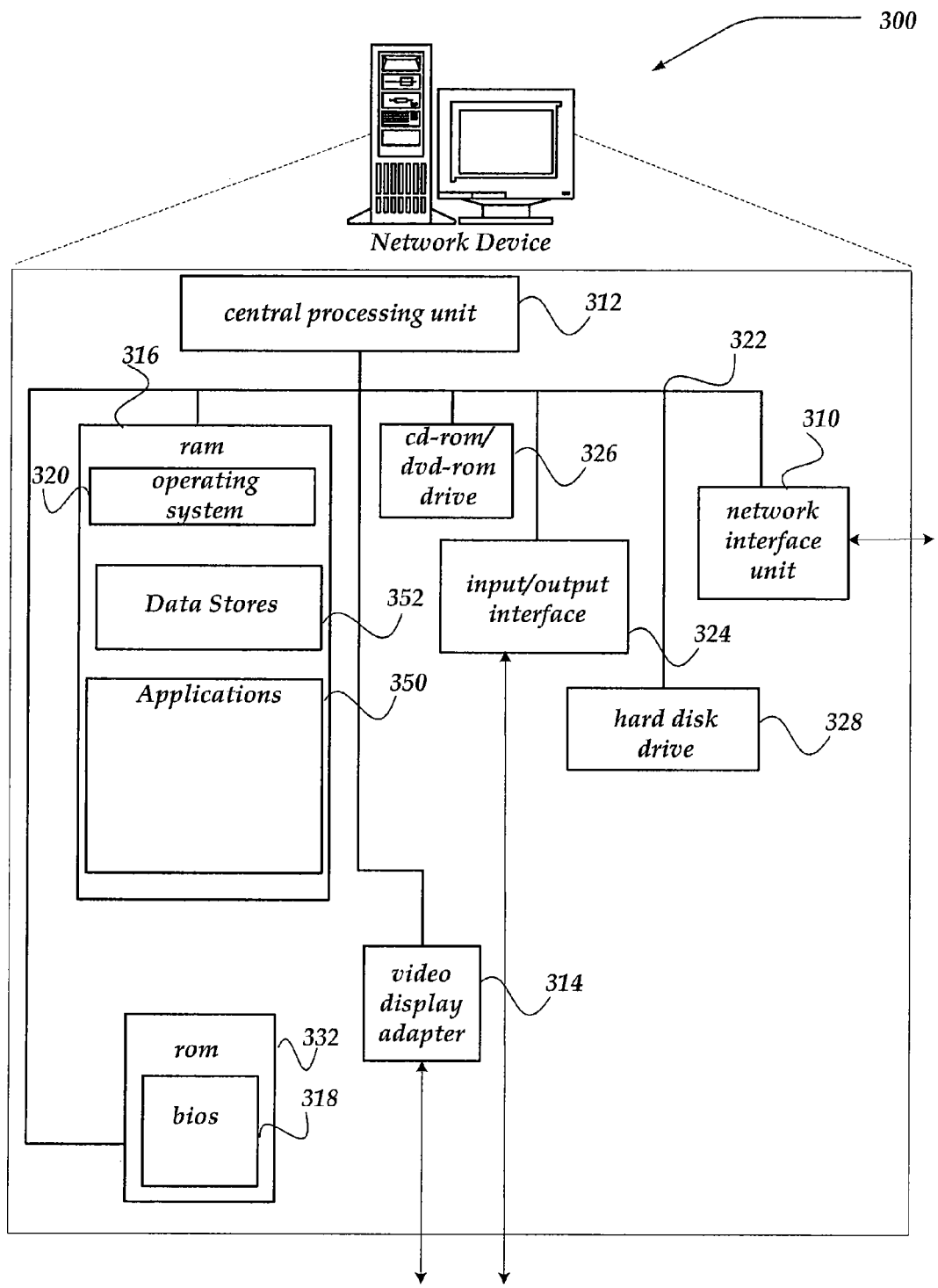
FIG. 3 shows a block diagram of one embodiment of a network device of FIG. 1.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, server device 107 of FIG. 1 and/or one or more of the client devices of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information.

The mass memory also stores program code and data. One or more applications 350 are loaded into mass memory and run on operating system 320 by central processing unit 312. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth.

Generalized Operation

Figure 4:
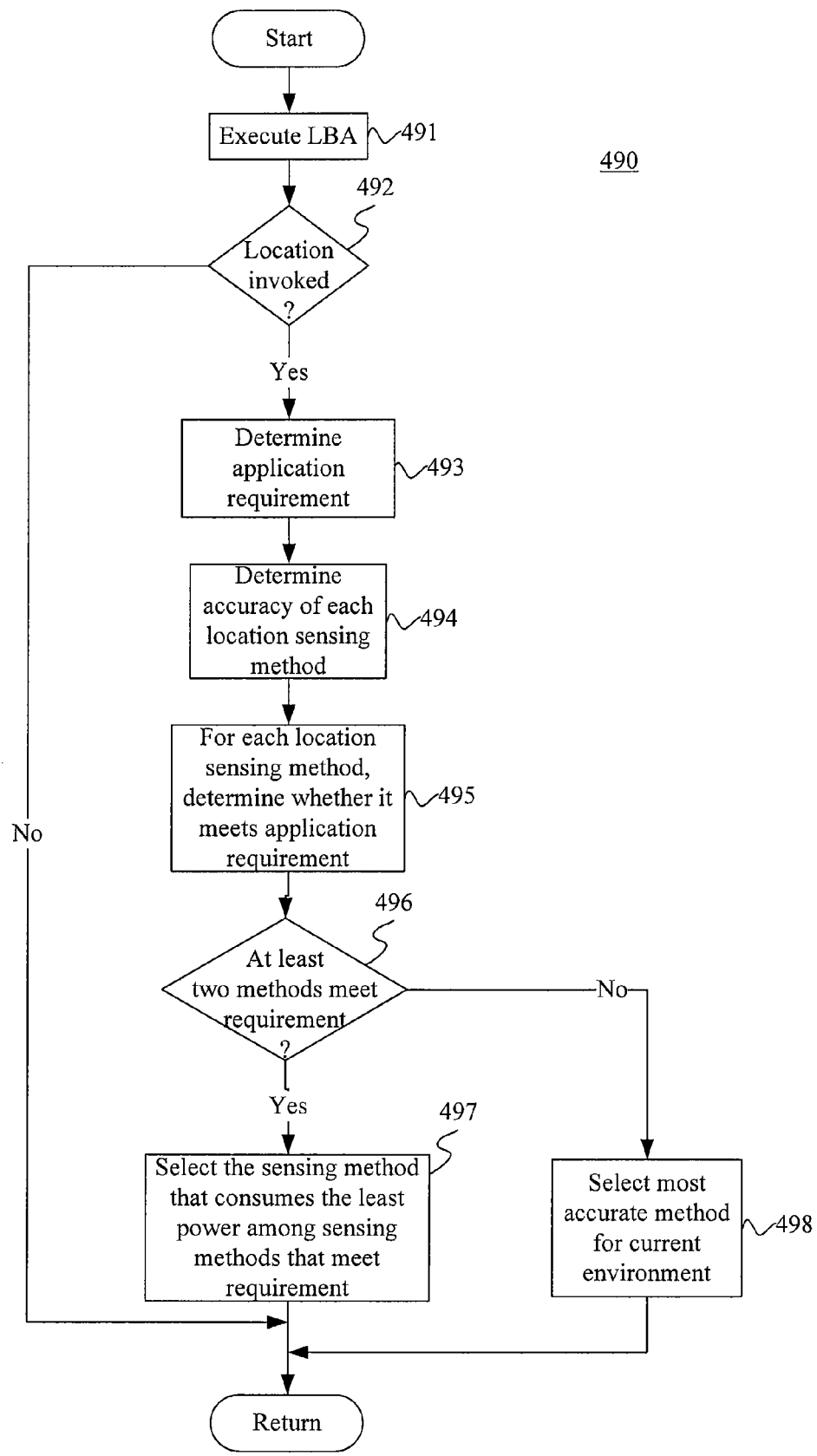
FIG. 4 illustrates a flow chart of an embodiment of a method that may be employed by an embodiment of the mobile device of FIG. 2.

FIG. 4 shows a flow chart of an embodiment of a method (490) that may be employed by an embodiment of client device 200 of FIG. 2. After a start block, the process proceeds to block 491, where an LBA is executed. The process then moves to block 492, where a determination is made as to whether a location is evoked by the location-based application. There are at least two location sensing methods that may be used by the LBA, and further steps of method 490 are used to determine which location sensing method to use to invoke the location.

If the determination at decision block 492 is negative, the process moves to a return block, where other processing is resumed. If however, the process at decision block 492 is positive, the process then moves to block 493, where the application requirement for location accuracy requirement by the location-based application is determined. The process then advances to block 494, where, for each location sensing method, the location accuracy for the current environment is determined. The process then proceeds to block 495, where, for each location sensing method, a determination is made as to whether the location-based sensing method meets the application requirement. Of course, any location-based sensing method that does not function in the current environment does not meet the application requirement.

The process then moves to decision block 496, where a determination is made as to whether at least two location sensing methods meet the requirement. If so, the process advances to block 497, where the location sensing method that consumes the least power among the location sensing methods that meet the application requirement is selected as the location sensing method to invoke the location. The process then proceeds to the return block, where other processing is resumed.

If, however, the determination at decision block 496 is negative, the process moves to block 498, where the most accurate location sensing method for the current environment is selected. Of course, a location sensing method that does not work at all in the current environment is not considered accurate. The process then proceeds to the return block.

Figure 5:
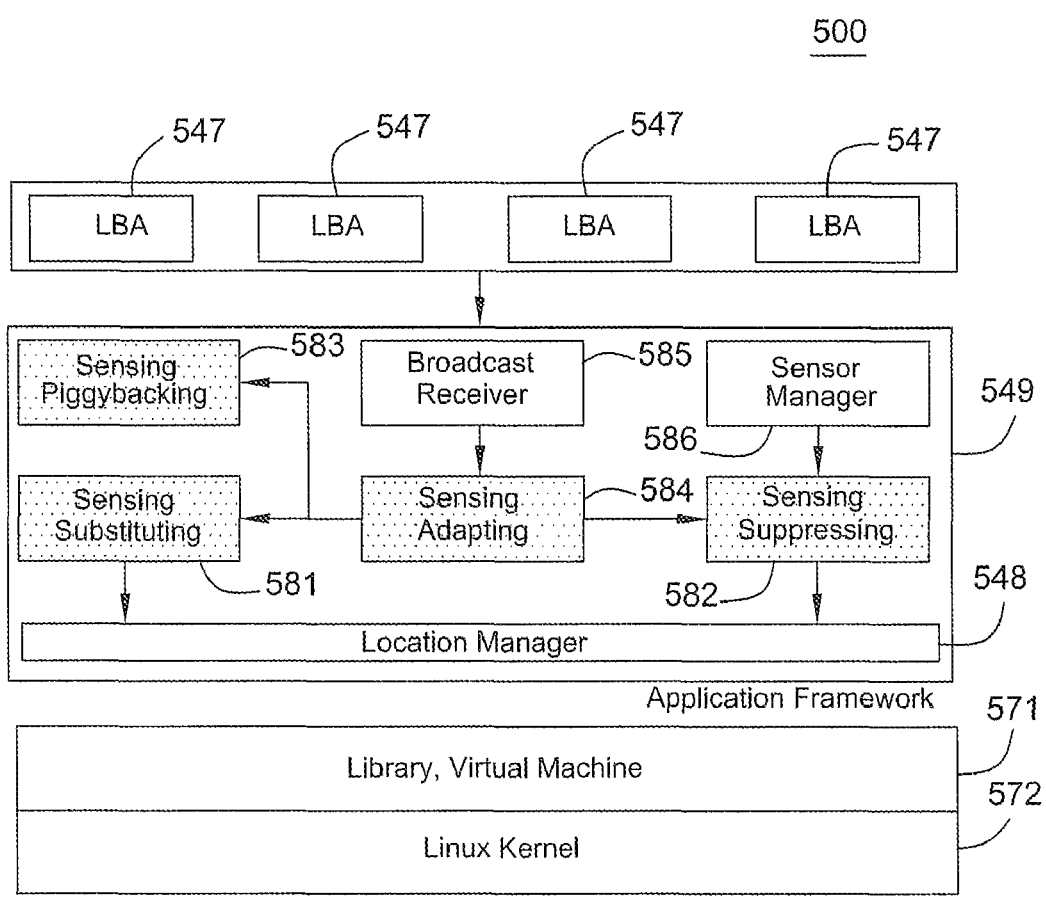
FIG. 5 shows a block diagram of an embodiment of an architecture that may be employed on an embodiment of the mobile device of FIG. 2.

FIG. 5 shows a block diagram of an architecture (500) that may be employed on an embodiment of mobile device 200 of FIG. 2. In some embodiments, mobile device 200 may be a smart phone, or the like. Architecture 500 includes LBAs 547, application framework 549, virtual machine 571, and kernel 572. Application framework 549 includes sensing substituting 581, sensing suppressing 582, sensing piggybacking 583, sensing adapting 584, broadcast receiver 585, sensor manager 586, and location manager 548. Although one embodiment of software architecture 500 is on an Android platform on a smart phone, the invention is not so limited, and other platforms may be employed.

In some embodiments, sensor manager 586 manages reading from sensors, such as an accelerometer and orientation sensors, that are monitored periodically, with information from the sensors used by sensing suppressing 582. Broadcast receiver 585 monitors the battery level of the smart phone and informs sensing adapting component 584 of the current battery level.

Components in application framework 549 operate together as an accelerator that effectively improves energy efficiency in location sensing for multiple LBAs 547 in a smart phone, or the like. In some embodiments, the accelerator includes the application four design principles: suppressing, piggybacking, substituting, and adapting. In other embodiments, only the sensing substituting principle is used. In other embodiments, the sensing substituting design principle, plus one or two or the other four principles are used together. Briefly, in some embodiments, suppressing uses other less power-intensive sensors to detect user states and suppresses unnecessary GPS sensing, when the user is in static state. In some embodiments, piggybacking synchronizes the location sensing requests of multiple LBAs 547. In some embodiments, substituting makes use of other location sensing method (e.g., network-based location sensing) that consume lower power than another location sensing method (e.g., GPS) does. In some embodiments, adapting can aggressively adjust system-wide sensing parameters such as interval and distance, depending on a battery level.

In some embodiment, one or more of the four design principles are implemented in the Android platform (e.g., v1.5) as a middleware. Even though the design principles are general enough to be applied to any layer, the middleware approach may achieve the benefit of application transparency. The middleware implementation may be employed in G1 Android Developer Phones (ADPs) and real LBAs, including real-time traffic, twitroid, and others. Depending on scenarios, some embodiments of FIG. 5 implemented in G1 Android Developer Phones and real LBAs may reduce the number of GPS invocations by up to 95%, and the battery life can be improved by up to 100%. However, the invention is not limited to Android or middleware and may be implanted in other ways in various embodiments. By implementing the design principles in middleware, in these embodiments, the implementation is application-transparent. The design principles operate under the application layer so that application designers of LBAs or other applications do not have to make any modifications to applications in order to accommodate any of the four design principles.

Off-the-shelf smartphones generally support two major types of location-sensing mechanisms—global positioning system (Gps) and network triangulation (Net). These sensing mechanisms typically have performance tradeoffs on accuracy, power-consumption, and dynamics. For instance, for the two location mechanisms supported by Android platforms, Gps is generally more accurate than Net. In terms of power-consumption, Gps consumes more power. As for dynamics, both GPS and network-provider expose certain degree of dynamics in terms of availability and accuracy. Specifically, Gps's accuracy and availability depends on a set of factors, especially exposure to satellites. Similarly, Net depends on the number of reachable access points (AP)s or cell towers and the availability of their location information.

Depending on specific environments (e.g., inside buildings) or contexts (e.g., phones being static), certain location-sensing operations may be unnecessary or impossible to perform, and blindly requesting location sensing cause power consumption. These environment and context information can be obtained by using other types of sensors such as mobility-related sensors. Today's mobile platforms are typically equipped with multiple sensors such as accelerometer, orientation sensors, magnetic sensors, light sensors, and data-connection. Many of them consume much less power than those used for location sensing. Accordingly, using these sensors to optimize location sensing can help conserve energy.

Given limited battery capacity, when the battery level is low, users typically are willing to tolerate degradation of location-accuracy in favor of longer operation time.

Mobile platforms are increasingly running multiple LBAs 547 with multiple location-sensing requests. Some embodiments of the invention take advantage of the multiple location sensing methods available on smartphones. Further, some embodiments of the invention use heterogeneous performance and power-consumption tradeoff from multiple sensing mechanisms and other sensors (e.g., accelerometer) to reduce sensing invocations. Further, some embodiments of the invention can converser battery power by adapting the parameters of location-sensing mechanisms.

Sensing Substituting Operation

Though various location providers such as Gps and Net exist, they have a variety of performance tradeoffs including energy consumption and accuracy. Android software development kit (SDK) classifies the mechanisms into fine-grained (e.g. Gps) and coarse-grained (e.g. Net), with the assumption that Gps always provides more accurate location information than Net. This assumption is not always true, but depends on the particular environment. For example, in certain indoor environments and dense urban areas, Gps may be unable to sense any location information, not to mention providing accurate location. Similarly, the performance of Net is heavily affected by the environment. In dense urban areas, for instance, wireless fidelity (WiFi)-triangulation can achieve as much as accuracy. But in rural areas where there are very few or even no APs, the WiFi-triangulation simply stops working The same is true for cell-tower triangulation. A general example of sensing substitution is illustrated above in FIG. 4. In one embodiment, the first location sensing method of FIG. 4 is GPS and the second location sensing method is Net.

Sensing Substituting 581 can choose the most appropriate location-sensing mechanism on the fly, without incurring more power consumption than the default requests. Specifically, in some embodiments, Sensing Substituting 581 is context-aware and learns the characteristics of the multiple location providers along the routes where phones move. Sensing Substituting 581 then performs location sensing in a more energy efficient manner by substituting another provider for the requested one. Since typical users follow fixed mobility pattern in terms of locations they visit routinely, such as going to office and back home, and each of the location mostly has stable environmental characteristics such as GPS signal strength and number of APs, utilizing the environmental information can help select the most appropriate location provider.

Sensing Substituting 581 relies on the learned environmental characteristics such as the availability and accuracy of the location providers. These characteristics are obtained by a Provider Profiler. The profiler monitors and stores relevant information, including current locations, number of visits to these locations, and the sensing characteristics of Gps and Net. The profiler maintains a database of the profiled mobility pattern. The data consists of a list of entries, and each entry corresponds to a profiled area. The areas can be represented in different forms. For example, it can be a physical area with certain geographical boundaries. It can also be more logically describable like a coffee shop. Essentially, the locations in the same area should exhibit similar sensing characteristics. The number of visits indicates the popularity of the area with respect to the particular user.

In some embodiment, the profiler is designed to be automatic. However, in other embodiments, to ensure higher degree of accuracy, it can also involve the users by allowing users to explicitly control the profiling process. For example, users may help specify the area boundary. In some embodiments, the profiler can be designed to calibrate periodically or depending on the changes in the profile characteristics. Essentially, whenever there is a need to do profiling, the process will be invoked. For instance, when the user moves to a new city for a new job, the profiler should be able to detect that and aggressively initialize the profiling process to accommodate the environment change. In particular, when the profiler is first initialized, it will do the profiling. After that, the profiling process keeps monitoring the necessity of performing profiling again. The necessity is measured by an opportunistic verification process. Specifically, profiling is periodically invoked to measure the positioning characteristics and compare the positioning characteristics to the information stored in the profiler database. If the comparison results in a large discrepancy value, then another profiling is needed. In some embodiments, the periodical verification is piggy-backed on the existing Gps/Net requests, so that the verification does not incur additional energy cost in terms of invoking more sensing requests.

With the profiled information, the dynamic selection process can decide the optimal selection of location providers. Specifically, first, when the user moves into an area where Gps is not available, location manager 548 shuts down GPS sensing and uses other location sensing mechanism (e.g., Net). Second, when a user moves into an area where the Net's accuracy is comparable to or even better than Gps, location manager 548 uses Net instead (as previously discussed, Net consumes less power than Gps). Third, when in areas where Net is not possible, location manager 548 invokes Gps for replacement. In some embodiments, since gps consumes more power than Net, the process use less frequent GPS sensing to maintain the same level of energy consumption.

Sensing Suppressing Operation

The bases for the sensing suppressing design principle are: (i) there are scenarios where continuous location-sensing is not needed. For example, location-sensing is unnecessary when the phone is placed on a table at home; and (ii) many sensors (e.g., accelerometer, orientation sensors, magnetic sensors, light sensors) consume different levels of powers. If such mobility-related contexts are known, future location-sensing requests can be potentially suppressed to save energy. The basic mobility-related context is whether the phone is static or moving, but it can contain more sophisticated information such as moving speed and direction. Such sophisticated information can be used to predict the phone's future locations rather than actually sensing them.

An aspect of this design principle is learning the mobility-related context (e.g., being static or moving) with energy-efficient sensors. Embodiments of the invention use low-power sensors including accelerometer and orientation sensors to profile users' location context, as opposed to the camera and microphone, which typically consume much more power than the low-power sensors, and are therefore not used by Sensing Suppressing 582.

It is preferable to ensure the correctness of mobility-context extraction. False positives of the extraction (i.e., falsely detect that the phone is moving while it is not) will lead to the unnecessary location sensing, while false negatives will cause more serious results for the changing locations cannot be sensed. Various approaches are employed in some embodiments to reduce these errors, particularly the false negatives. First, in some embodiments, the framework exposes a configuration option to the user, allowing the user to manually enable/disable the suppressing option. Second, in some embodiments, the aggressiveness of suppressing can be automatically adjusted based on other information such as the confidence levels of the learned mobility context. The confidence levels can be determined by information such as familiarity of the current locations and routes. Third, in some embodiment, suppressing can be adjusted based on the application requirements. For example, if the application requires very coarse location information, the suppressing can choose to work. Otherwise, it may choose to be disabled. Fourth, in some embodiments, certain verification mechanisms can be used to verify the correctness of the predication. For example, location sensing can be invoked periodically for verification purposes even when in suppressing mode.

Sensing Piggybacking Operation

A purpose of sensing piggybacking 583 is to re-use the existing sensing registration by piggybacking new sensing requests on existing ones, thus eliminating some location sensing and conserving energy. For example, assuming there is a LBA 547 requesting location sensing every 2 minutes when the second LBA 547 starts, if the new LBA 547 requests sensing with the same time interval, it can simply piggyback on the existing registered requests, thus eliminating the overhead of performing separate sensing. Reducing the number of separate sensing can help save the energy associated with sensing as the sensing hardware can go to sleep between sensing.

Applications may request and register the sensing in various ways, as supported by the underlying framework or system. Android platform (e.g., Version 1.5), for example, allows application designers to perform two types of sensing registration. In the first type, the application may choose to statically register a location listener, and the location updates will be sent to the listener periodically according to the specified parameters including minimum time interval and minimum distance interval. This method is simple, but it relies on the underlying framework to allow GPS sleeping between two sensing operations. For example, if a Gps registration requires 30 seconds to perform the sensing, then if the specified minimum time interval is more than 30 seconds, the framework can choose to turn off the Gps and put it into sleep to conserve energy. The other type is to explicitly register/unregister the GPS sensing registrations to allow for hardware sleeping. For instance, if the preferred minimum time interval between two sensing reports is 1 minute, the application can register/unregister the request every one minute. Assuming unregistering Gps will put GPS into sleeping mode, this method does not rely on the underlying framework to support energy conservation through GPS sleeping. This treatment may have other benefits such as avoiding unnecessary sensing when the GPS report is not needed or GPS sensing is not possible. The downside of this method is the increased complexity of the application design.

In the following, the first type of registration is referred to as One-time Registration, while the second type of registration is referred to as Multi-time Registration, which each makes use of the underlying GPS in different fashions. For One-time Registration, depending on the mobile systems, optimizations might be applied to save energy. Whether and how to apply the techniques depends on the GPS location management of multiple registrations. Specifically, when there are multiple sensing registrations, the underlying location manager needs to accommodate multiple registrations with different sensing requirements. For example, if there are two registrations, one of them requires gps sensing every 2 minutes, and the other requires every 1 minute, location management 548 may choose to combine these two registrations by simply considering the finest one, i.e., every 1 minute.

When a registration is instantiated, the location sensing is immediately attempted to get the sensing values. Such behavior can be wasteful if another location sensing request of the same type will occur within a short period of time. The result is two separate location sensing operations. For Multi-time Registration, in some embodiments, it is preferable to piggyback the otherwise wasteful sensing on other sensing operations. Specifically, in some embodiments piggyback location sensing with respect to the following two scenarios. These two scenarios concern the joining of new applications. The location sensing requirements are described herein as ($G_1$, $T_1$, D1), where $G_1$ is the granularity of sensing, $T_1$ being the minimum sensing time interval and $D_1$ being the minimum distance interval. Where other applications are running when an application joins, ($G_f$, $T_2$, $D_2$) denotes the finest fine-grained location sensing registration, and ($G_c$, $T_3$, $D_3$) denotes the finest coarse-grained registration.

The joining LBA has fine-grained request: When a fine-grained registration with ($T_1$, $D_1$) comes, the current registered requests are checked. (i) If there are fine-grained requests registered so far with ($T_2$, $D_2$), this value pair is compared to ($T_1$, $D_1$). If ($T_1$, $D_1$)>($T_2$, $D_2$), it waits for the firing of next sensing. On average, it waits for $T_2$ 2time. (ii) if only coarse-grained is registered, then it immediately moves on to register fine-grained request.

The joining LBA has coarse-grained request: When a fine-grained registration with ($T_1$, $D_1$) comes, the current registered requests are checked. (i) If there are coarse-grained requests registered so far with (T3, D3), this value pair is compared to ($T_1$, $D_1$). If ($T_1$, $D_1$)>($T_3$, $D_3$), it waits for the firing of next sensing. On average, it waits for $T_3$ 2time. (ii) if only fine-grained is registered, then it compares to ($T_2$, $D_2$) to see whether the current registration satisfies its requirement. If so, it uses the current one; otherwise, registers a coarse-grained request.

Sensing Adapting Operation

Sensing adapting 584 adapts the location sensing frequency based on the current battery level. The reason for doing so is the preference of longer operation time over higher accuracy. Except for running several accuracy-critical applications, users most likely are willing to trade accuracy for time for the simple reason of continuous operations. For instance, when the battery level is low, and a user is playing Twitter on his mobile phone and using the Gps for the location sensing, he might be more willing to run the application with less-accurate locations in return for longer operational time.

The adaptation can be performed on several types of operations. For instance, the GPS sensing time intervals can be changed, the minimum GPS sensing distance can be adjusted. Specifically, if there is a need to conserve energy more aggressively when battery-level is low, the sensing time intervals and distance intervals can be increased correspondingly by a function $f_{BA}$. Denoting the requested time update interval, distance update interval, and current battery level as $T_i$, $D_i$, and $L_b$, respectively, the values of $T_i$ and $D_i$ can be obtained by ($T_i$, $D_i$)=$f_{BA}$($T_i$, $D_i$, $L_b$).

However, some applications are critical about the location accuracy regardless of the battery level. Examples of such applications include certain health-care and military usage. With these applications, any adaptation based on battery-level has to respect the application requirement.

In part because of the criticality of certain applications, in some embodiments sensing adapting 584 explicitly asking the users to decide whether to perform adaptation or not. First, for the same applications, different users may assign them with different importance in terms of location accuracy. For example, given a health-care application, a healthy teenager may think that to be unimportant, while an elder patient may think it to be of critical importance. Second, even for the same application and same user, the importance of location accuracy may also vary. For instance, when a person is sick, the health-care application becomes more important. Whenever adaptation is needed, the user is notified of the forthcoming adaptation and has the opportunity to enforce it or reject it. The user can even be given finer decisions such as deciding the adaptation parameter values. Practically, the user may be greeted with a user-interface which notifies the user and asks about the preferred decision. Then the user can make his decisions based on his preference. Some embodiments may employ a more intelligent design which remembers or even predict the users' selection, thus reducing the users' overhead of making decisions.

There are different approaches to energy saving by adapting certain behaviors, each focusing on one way of saving energy. Other than the location-determination context, there are other types of approaches such as adjusting the screen light, sleep-time, or even the volume of ring tongs. In some embodiments, the following location-sensing related behaviors are adjusted: (i), the adaptation can be done by changing the sensing frequency or interval. In some embodiments, when battery level is low, the existing sensing registration will be modified to have larger sensing intervals. This can practically be done by removing registration and adding registrations. When new applications register location sensing, the sensing intervals are also increased. (ii), in some embodiments, the adaptation can be done by changing the sensing distance interval. Similar to the preceding approach, the distance intervals are modified to reflect the battery-levels. (iii), in some embodiments, the adaptation can be performed by adjusting the aggressiveness of the other three design principles. For example, the sensing-suppressing can be more aggressively used to reduce the location sensing usage. As another example, sensing substituting can be more aggressive; for example, for each LBA, the application requirement can be lowered so that, in the sensing substitution, less accuracy is required for each location sensing method to meet the application requirement.

As previously discussed, architecture 500 can be realized as middleware, residing between applications and underlying libraries and kernels. Specifically, in some embodiments, architecture 500 employs the Android platform, which has the Application Framework 549 that packages many classes and interfaces. The realization can be performed inside the Application Framework 549, by both modifying existing classes and adding new classes. As illustrated in FIG. 5, all the four design principles can be implemented inside the framework, and particularly the Battery-aware Adapting can work together with the other three design principles. As previously discussed, some embodiments of the invention do not use all four design principles, and accordingly sensing suppressing 582, sensing piggybacking 583, and sensing adapting 584 are all optional features that are used in some embodiments and not used in other embodiments.

Figure 6:
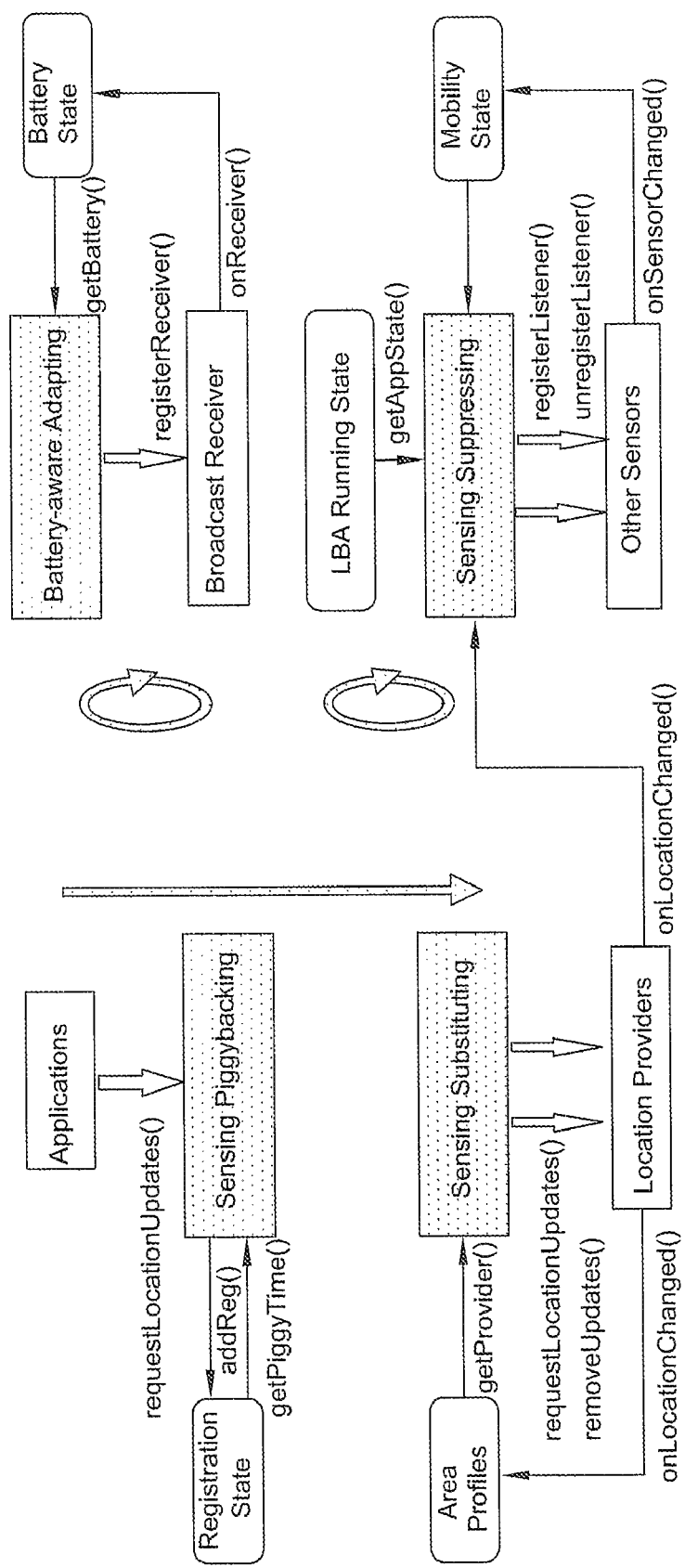
FIG. 6 illustrates a functional block diagram of a deployment model of an embodiment of the architecture of FIG. 5 on the Android platform.
Figure 7:
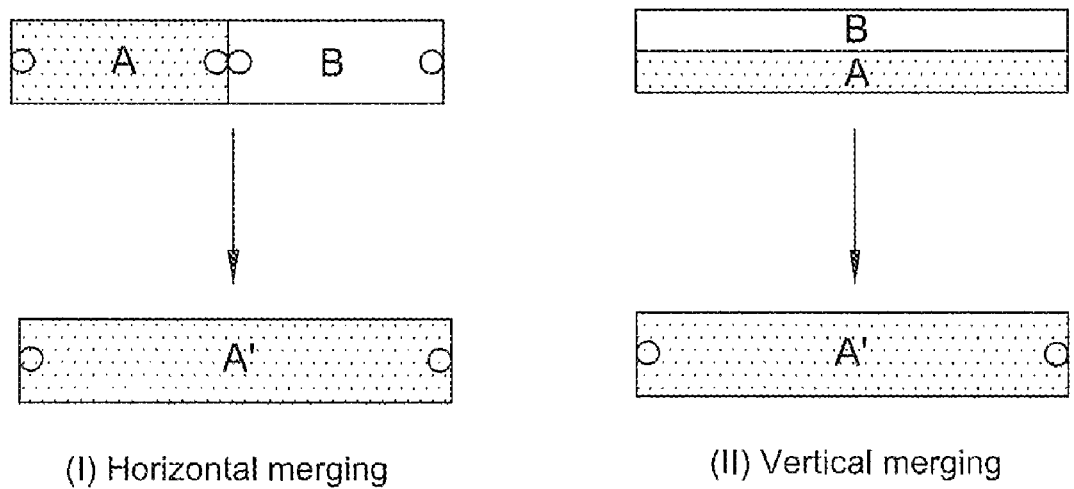
FIG. 7 illustrates an embodiment of merging that may be employed for an embodiment of the mobile device of FIG. 2, in accordance with aspects of the present invention.

FIG. 6 illustrates a functional block diagram of a deployment model of an embodiment of architecture 500 of FIG. 5 on the Android platform. In some embodiments, the deployment model on Android mobile system may be used as follows. One of more of the four design principles can be realized on top of existing classes and interfaces of the current Android Application Framework.

With this deployment model, the adoption of certain embodiments of the invention is through a new system image, which includes both the Application Framework and embedded applications. Users can simply re-compile or download the system image, then update the phones with a utility.

The design principles of Sensing Piggybacking and Sensing Substituting are executed sequentially in some embodiments. In some embodiments, whenever the framework detects the registration of location sensing by hooking on the noted function calls, it will perform Sensing Piggybacking and Sensing Substituting sequentially based on the respective states. Specifically, in some embodiments, Sensing Piggybacking records the location-sensing registrations into Registration State and obtains the piggybacking time by checking this state. In some embodiments, Sensing Substituting reads the Area Profile State and determines the most appropriate location provider.

The design principles of Battery-aware Adapting and Sensing Suppressing can be implemented with separate threads, and their invocations are triggered by battery level changes and timers. Specifically, in some embodiments, Battery-aware Adapting registers for battery change updates with the Broadcast Receive, and the received battery level information is kept as Battery State. In some embodiments, Sensing Suppressing periodically checks the application running states and the user's mobility state for the purpose of registering or unregistering sensors. It maintains two states: LBA Running State and Mobility State.

As previously discussed, some embodiments may be implemented on a G1 Android Developer Phone (ADP1) as a middleware approach, with some or all of the four design principles and the mobility profiling process implemented in Java inside Android Framework. In some embodiments, the architecture 500 contains GUI interfaces which allow the user to enable, disable and configure the accelerator. In some embodiments, the GUI interfaces allow the display of a configuration interface for the desired sensing adaptation degree. The interface may also show the expected battery saving time with the current adaptation degree.

Sensing Adapting Embodiment

In some embodiments, Sensing adapting 584 is generally invoked when a LBA 547 is started and requests location sensing. When the battery level is low (e.g. 30%), the location manager 548 asks the user whether to perform Sensing Adapting or not. If adaptation is enabled, the user can then choose the preferred adaptation degrees. In some embodiments, the device then functions based on the decision and values input by the user.

Sensing Adapting 548 acquires the battery information including the current battery level. Broadcast Receiver 585 handles the intent. In some embodiments, the function used to register is registerReceiver( ), which is a method of the Context class in Android SDK. Because of this, Sensing Adapting 548 piggybacks the registration on an existing application in Android platform: SecuritySettings, which is extended from Context. Specifically, in some embodiments, in the onCreate( ) method, SecuritySettings registers the BroadcastReceiver and an IntentFilter. In some embodiments, whenever the battery level changes, the receiver is notified and appropriate information is recorded.

In some embodiments, Applications running on Android platforms are essentially independent in the sense that each application has a private directory and each application runs in a separate java virtual machine. For communications between activities within a single application, and between different applications, Android SDKs provide several mechanisms including shared preferences, content providers, database, and system properties. Unfortunately, none of these mechanisms works for the communication between application layer and framework layer. In some embodiments, files are used as the intermediate media for these two layers to communicate. Specifically, applications and frameworks both access the same files under the data directory of the system, which can be obtained by getDataDirectory( ) call.

There are various types of data that are shared. For simplicity, a separate file may be used for each type of data. The reading and writing functions may be implemented at Framework layer, inside the BatteryState class. Specifically, the class provides two types of methods: get( ) and set( ), to read and write the interested information, respectively.

Sensing Piggybacking Embodiment

Android phones support both Gps and Net mechanisms. LBAs can request the location sensing by registering the sensing requests, and after that, future location updates will keep coming and invoking the callback function (e.g., on LocationChanges( )). The registrations can take several parameters including the desired location provider, update time interval and update distance interval. The time interval and distance interval indicate how often the location update should be received in temporal and physical dimensions. To save energy, the time and distance intervals are preferred to be large enough to allow sleeping of the sensing devices such as GPS.

As previously discussed, with multiple LBAs, the sleeping time could be small if the location sensing requests coming from different applications are not synchronized. Sensing Piggybacking 583 may be employed to force the incoming registration request to synchronize with existing location-sensing requests. Sensing Piggybacking 583 may be employed to predict the next sensing registration by existing LBAs 547, and asks the incoming LBA 547 to delay the registration. Specifically, in some embodiments, if the registration time for the next request is Ttime later, then the incoming request will be delayed for Tso that one request can be saved, and the sensing device can potentially have more time in sleep mode.

In order to perform piggybacking, sensing piggybacking 583 learns and maintains the location sensing registration history. The registration states are maintained with two array lists, one for Gps and the other for Net. Each element of the lists contains three members: registration time, registration time interval and registration distance interval.

Sensing piggybacking 583 also needs to determine the validity of the maintained states. Specifically, since any prediction of future registration is based on historically maintained states, the state might be invalid when the maintained states are outdated because the requesting LBAs 547 may stop running or stop registering. In some embodiments, when a new registration comes, sensing piggybacking 583 first checks whether the maintained state is valid. A state is valid only when the most recent registration time recorded is no more than some time older than the current system time. The default threshold value for the first condition is 4, and the default threshold value for determining the second condition is 2. If the predicted request which is supposed to occur after Ttime does not come in 2Ttime, then the state is invalid, indicating either the application changed the registration pattern or the application has stopped running.

In some embodiments, Sensing piggybacking 583 hooks into the registerLocationUpdate( ) function of the LocationManager Class of Android Framework. When receiving the above function call, sensing piggybacking 583 checks the validity of the maintained registration state. If the state is invalid, the request is passed through and is added to the registration history. If the state is valid, then sensing piggybacking 583 will determine the piggybacking time (i.e., the delay). In some embodiments, sensing piggybacking 583 determines the piggybacking time in six different usage scenarios based on the currently registration states types and the incoming new registration type. Specifically, in some embodiments, the currently maintained state types can be Gps only, Net-only, or both Gps and Net. The incoming new request can be Gps-request or Net-request.

In some embodiments, sensing piggybacking 583 operates as follows in the following six scenarios. For simplicity, (Maintained states, Incoming state) denotes each scenario. Also, (t, $T_0$, $D_0$) denotes the incoming request, t is the incoming request time, T0 denotes the requested update time interval, and D0 denotes the requested distance interval. For the maintained state, (Gps, $T_1$, $D_1$) denotes the Gps state with the finest time interval being $T_1$ and finest distance interval being $D_1$. Further, (Net, $T_2$, $D_2$) denotes the Net state with the finest time interval being $T_2$ and the finest distance interval being $D_2$.

({Gps},Gps): Sensing piggybacking 583 checks whether the state of (Gps, $T_1$, $D_1$) is valid. If so, then it compares ($T_1$, $D_1$) to ($T_0$, $D_0$). If $T_1<T_0$ and $D_1<D_0$, then piggybacking is enabled, and the piggybacking time is calculated.

({Gps},Net): As Net has coarser location information than Gps, the operations are similar to the ({Gps},Gps) scenario, but the comparison is between ($T_2$, $D_2$) and ($T_0$, $D_0$).

({Net},Net): similar to (Gps,Gps) case by replacing Gps by Net.

({Net},Gps): Since Gps is finer than Net, the request cannot be piggybacked on existing Net state, so the registration is passed immediately without performing piggybacking ({Gps,Net},Gps): Sensing piggybacking 583 checks the Gps state only. The process is similar to that of ({Gps}, Gps).

({Gps,Net},Net): Sensing piggybacking 583 firstly checks the Net state, which is similar to that of ({Net},Net). If not possible to piggyback, then it checks the Gps state, and the process is similar to that of ({Gps},Net) scenario.

Sensing Substituting Embodiment

The design principle of sensing substituting aims to determine the most appropriate location provider on-the-fly, and dynamically use that location provider, irrespective of what the location provider the application requested. Specifically, in some embodiments, when the requested location provider is Gps, and Gps becomes unavailable, then sensing substation 581 checks the availability of Net for use. If Net is available, the component obtains the accuracy value of Net and determines whether to use it or not based on application requirement. The determination process can be controlled by the user with a pop-up dialog informing the Net accuracy and asking actions. When the requested provider is Net provider, which becomes unavailable, and Gps is used if available. In some embodiments, since Gps consumes more power, to maintain the same level of power consumption, Gps is requested with reduced location update frequency.

In order to perform dynamic selection of location providers and accommodate the mobility of the phone, sensing substituting 581 may be invoked periodically. In some embodiments, a separate thread inside the LocationManager Class is used to do that. Specifically, in some embodiments, whenever the task is invoked, sensing substituting 581 attempts to determine the most appropriate area where the phone is residing. After finding such an area from the profiled data, then sensing substituting 581 attempts to determine the available location provider based on the profiled data. If the only available provider is different from what is requested, sensing substituting 581 unregisters the current provider and registers the available one. Specifically, in some embodiments, sensing substituting 581 uses the handler class of Android. In some embodiments, sensing substituting 581 captures the registration of the provider, and records the registered provider, the listener, the registered time update interval and the distance interval. This information is used for new registration.

For each time of invoking, the current location's profiles of location providers are checked. The profiles are initialized by training data and are updated by monitoring the sensed characteristics of the running LBAs. The profiles are extracted into areas, each of which has the same characteristics of the location providers. In other words, as discussed in greater detail below, locations inside the same area have the same physical characteristics of Gps and Net.

In some embodiments, the profiles are read into the memory whenever the instance of LocationManager is created. The data are stored in a list of Areas. In some embodiments, to reduce false negatives, sensing substituting 581 uses two locations to decide the current area: the immediate previous location and the current location. For each dynamic-selection invocation, if both locations are inside the same area, and the moving directions and speed suggest that the user will be in this area for a while, then the area is determined to be the current area. Specifically, in some embodiments, given a location, all areas that contain both locations are extracted. These areas are candidate areas for the determination of the most appropriate area. In some embodiments, the determination is based on the number of visits and the most current visit time. After the single area is determined, then it chooses the most appropriate provider based on the profiled area characteristics.

Sensing Suppressing Embodiment

In some embodiments, the Sensing Suppressing component 582 monitors the user's context with other non-energy-intensive sensors such as accelerometers and orientation sensors. When the user is in a state where location-sensings can be suppressed, sensing suppressing 582 can save energy by suppressing the location sensing.

In some embodiments, when LBAs 547 are running and the location services are registered, sensing suppressing 582 creates a thread to detect whether the phone is in static or moving state. If the current state is static, then sensing suppressing 582 removes the previous registration; if not static, then it registers the registration again. In some embodiments, the thread is invoked periodically (e.g., every 1 minute).

In some embodiments, inside the thread, sensing suppressing keeps reading accelerometers and orientation sensors to detect mobility. Whenever there is change of the state, these sensors will typically experience significantly changed values. In some embodiments, the user state is detected to be static only when both microscopic (e.g., two neighboring readings) and macroscopic (e.g., 5 second) changes are not detected. Furthermore, in some embodiments, to reduce the false negative (i.e., mobility being detected as being static) probability, if no mobility is detected, then the user state is considered to be transiently static, and this state has to be maintained for some time before inferring that the user is being static.

The four components of sensing substituting 581, sensing suppressing 582, sensing piggybacking 583, and sensing adapting 584 can work together for better energy saving in various scenarios. For example, upon initial use of the device, the battery level may be high and the user starts a first LBA 547. After another LBA 547 is started, Sensing Piggybacking 583 is operating. When the user becomes static, Sensing Suppressing 582 begins to work. When the battery level becomes low, Sensing Adapting 584 comes into play. As the user starts moving, Sensing Suppressing 582 is stopped and Sensing Substituting 581 is invoked when necessary.

Mobility Profiling

In some embodiments, the design elements of sensing suppressing and sensing substituting (dynamic selection) use the Zarea structure to organize the locations. Each Zarea has several types of properties. (i) Boundary-related properties. Essentially each Zarea is a rectangle area bounded by a starting point, an ending point, and a width. The points are specified with latitude and longitude coordinates. (ii) Usage-related properties. The area also contains the number of visits and the last visit time. (iii) Motion-related properties. For later usage of sensing suppressing, each area has the same activity pattern (walking, driving, staying), confidence (known, unknown), speed (constant, varying); (iv) Location-Provider-related properties: It also contains two Sensing-Character (gps and network) and an ActivityState instances; The SensingChracter has three members: availability, accuracy and precision; ActivityState has three members: activity, pattern, and speedstate.

Initially, each Zarea is a rectangle constructed based on the two neighboring location readings from the mobility traces. Later, Zareas can be merged, as illustrated in FIG. 6. There are two types of merging scenarios: Horizontal and Vertical. Horizontal merging occurs when the starting point of one area is adjacent to the ending point of the other area or the starting point is inside of the other area. Vertical merging occurs when the two neighboring areas have adjacent starting points and ending points. The conditions of merging are the two areas are adjacent to each other and the motion-related and Location-provider-related properties are the same. When the conditions are met, merging is performed and the properties of the new area are updated. Specifically, the starting, ending points and the width are updated to represent the new area. The LastTime is updated to the more recent LastTime of the previous two areas, and the Frequency is set to be the average of the two Frequency values. The basic operations of these two types of merging are shown in FIG. 6.

Zareas can be replaced to conserve storage space and maintain scalability. In some embodiments, the prioritization is enforced in the following order: Frequency, LastTime, and Area size.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A network device for communicating over a network, comprising:
   a transceiver configured to communicate over the network;
   a non-transitory computer-readable medium; and
   a processor configured to perform the steps of:
      executing a location-based application stored on the non-transitory computer-readable medium; and
      when the location-based application invokes a location, selecting a location sensing method from a plurality of sensing methods to use to invoke the location, wherein the selecting includes:
         determining an application requirement for location accuracy required by the location-based application;
         for each of the location sensing methods of the plurality of location sensing, methods:
            determining a location accuracy for the sensing method at the current environment; and
            determining whether the location accuracy at the current environment meets the application requirement for location accuracy required by the location-based application; and
         if two or more of the location sensing methods of the plurality of location sensing methods meet the application requirement for location accuracy, selecting the location sensing method from among the location sensing methods that meet the application requirement for location accuracy that consumes the least power as the location sensing method to use to invoke the location; else selecting the location sensing method with the greatest location accuracy for the current environment as the location sensing method to use to invoke the location.

2. The network device of claim 1, wherein the plurality of location sensing methods includes global positioning system (GPS).

3. The network device of claim 1 wherein the plurality of location sensing methods includes network triangulation.

4. The network device of claim 1, wherein the processor further configured to perform the step of:
   periodically updating the selection of the location sensing method based on the current environment.

5. The network device of claim 1, wherein the network device further includes:
an accelerometer and a plurality of orientation sensors that are arranged to provide motion data;
wherein the processor is further configured to perform the steps of:
employing the motion data to determine whether the network device is moving or stationary; and
suppressing and re-enabling the location-sensing methods based, at least in part, on whether the network device is determined to be moving or stationary.

6. The network device of claim 1, wherein the processor is further configured to perform the steps of:
executing another location-based application, wherein said another location-based application periodically requests location sensing, and wherein the location-based application also periodically requests sensing; and
periodically employing the selecting sensing method based on, the periodic requests of both the location-based application and said another location-based application and using results of the location-based application for both the location-based application and said another location-based application.

7. The network device of claim 1, wherein the processor is further configured to perform the steps of:
after a request from the location-based application for sensing adapting, prompting a user to enable sensing adapting; and
when the users selects to enable sensing adapting, reducing a sensing interval of the location sensing method.

8. The network device of claim 1, wherein the processor is further configured to perform the steps of:
after a request from the location-based application for sensing adapting, prompting a use to enable sensing adapting; and
when the users selects to enable sensing adapting, reducing a sensing distance interval of the location sensing method.

9. The network device of claim 1, wherein the processor is further configured to perform the steps of:
after a request from the location-based application for sensing adapting, prompting, a user to enable sensing adapting; and
when the user selects to enable sensing adapting, decreasing the application requirement for location sensing accuracy such that less accuracy is require to meet the application, requirement.

10. A method for communicating over a network, comprising:
executing a location-based application; and
when the location-based application invokes a location, selecting a location sensing method from a plurality of sensing methods to use to invoke the location, wherein the selecting includes:
determining an application requirement for location accuracy required by the location-based application;
for each of the location sensing methods of the plurality of location sensing methods:
determining a location accuracy for the sensing method at the current environment; and
determining whether the location accuracy at the current environment meets the application requirement for location accuracy required by the location-based application, and
if two or more of the location sensing methods of the plurality of location sensing methods meet the application requirement for location accuracy selecting the location sensing method from among the location sensing methods that meet the application requirement for location accuracy that consumes the least power as the location sensing method to use to invoke the location; else selecting the location sensing method with the greatest location accuracy for the current environment as the location sensing method to use to invoke the location.

11. The method of claim 10, wherein the plurality of location sensing methods includes global positioning system (GPS).

12. The method of claim 10, wherein the plurality of location sensing methods includes network triangulation.

13. The method of claim 10, further comprising:
periodically updating the selection of the location sensing method based on the current environment.

14. The method of claim 10, further comprising:
obtaining motion data from an accelerometer and a plurality of orientation sensors; employing the motion data to determine whether a mobile device is moving or stationary; and
suppressing and re-enabling the location-sensing methods based, at least in part, on whether the mobile device is determined to be moving or stationary.

15. The method of claim 10, further comprising:
executing another location-based application, wherein said another location-based application periodically requests location sensing, and wherein the location-based application also periodically requests sensing; and
periodically employing the selecting sensing method based on the periodic requests of both the location-based application and said another location-based application and using results of the location-based application for both the location-based application and said another location based application.

16. The method of claim 10, further comprising:
after a request from the location-based application for sensing adapting, prompting a user to enable sensing adapting; and
when the user selects to enable sensing adapting, reducing a sensing interval of the location sensing method.

17. The method of claim 10, further comprising:
after a request from the location-based application for sensing adapting, prompting a user to enable sensing adapting; and
when the users selects to enable sensing adapting, reducing a sensing distance interval of the location sensing method.

18. The method of claim 10, further comprising:
after a request from the location-based application for sensing adapting, prompting a user to enable sensing adapting; and
when the user selects to enable sensing adapting, decreasing the application requirement for location sensing accuracy such that less accuracy is require to meet the application requirement.

19. A device including a non-transitory processor-readable medium having processor-executable code encoded therein, which when executed by one or more processors, performs actions for communicating over a network, comprising:
executing a location-based application; and
when the location-based application invokes a location, selecting a location sensing method from a plurality of sensing methods to use to invoke the location, wherein die selecting includes:
determining an application requirement for location accuracy required by the location-based application;

for each of the location sensing methods of the plurality of location sensing methods:
  determining a location accuracy for the sensing method at the current environment; and
  determining whether the location accuracy at the current environment meets the application requirement for location accuracy required by the location-based application; and
if two or more of the location sensing methods in the plurality of location sensing methods meet the application requirement for location accuracy selecting the location sensing method from among the location sensing methods that meet the application requirement for location accuracy that consumes the least power as the location sensing method to use to invoke the location; else selecting he location sensing method with the greatest location accuracy for the current environment as the location sensing method to use to invoke the location.

20. The device of claim 19, the actions further comprising: periodically updating the selection of the location sensing method based on the current environment.

* * * * *